US012113741B2

(12) United States Patent
Matsumura et al.

(10) Patent No.: US 12,113,741 B2
(45) Date of Patent: Oct. 8, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 85 days.

(21) Appl. No.: 17/595,881

(22) PCT Filed: May 31, 2019

(86) PCT No.: PCT/JP2019/021851
§ 371 (c)(1),
(2) Date: Nov. 29, 2021

(87) PCT Pub. No.: WO2020/240863
PCT Pub. Date: Dec. 3, 2020

(65) Prior Publication Data
US 2022/0239437 A1    Jul. 28, 2022

(51) Int. Cl.
*H04W 72/00* (2023.01)
*H04B 1/74* (2006.01)
*H04L 5/00* (2006.01)
*H04W 76/19* (2018.01)

(52) U.S. Cl.
CPC ............ *H04L 5/0051* (2013.01); *H04B 1/74* (2013.01); *H04L 5/006* (2013.01); *H04W 76/19* (2018.02)

(58) Field of Classification Search
CPC ......... H04L 5/0051; H04L 5/006; H04B 1/74; H04B 7/0695; H04W 76/19; H04W 16/28
See application file for complete search history.

(56) References Cited

U.S. PATENT DOCUMENTS

| | | | |
|---|---|---|---|
| 8,824,359 B2* | 9/2014 | Cai ...................... | H04W 72/541 |
| | | | 455/452.2 |
| 11,121,758 B2* | 9/2021 | Venugopal ........... | H04B 7/0695 |
| 11,152,999 B2* | 10/2021 | Zhou ...................... | H04B 7/088 |
| 11,272,561 B2* | 3/2022 | Wei ...................... | H04B 7/0695 |
| 11,343,735 B2* | 5/2022 | Cirik ...................... | H04W 72/20 |
| 2013/0100912 A1* | 4/2013 | Cai ........................ | H04W 72/23 |
| | | | 370/329 |
| 2019/0044689 A1* | 2/2019 | Yiu ........................ | H04W 72/23 |

(Continued)

FOREIGN PATENT DOCUMENTS

WO     2018203719 A1     11/2018

OTHER PUBLICATIONS

Notice of Reasons for Refusal issued in Japanese Application No. 2021-522598 mailed on Nov. 15, 2022 (6 pages).
NEC, "Discussion on multi-beam operation", 3GPP TSG RAN WG1 #97, R1-1906399, Reno, US, May 13-17, 2019 (3 pages).
Convida Wireless, On Beam Failure Recovery for SCell, 3GPP TSG-RAN WG1 #97, R1-1907466, Reno, USA, May 13-17, 2019 (6 pages).

(Continued)

*Primary Examiner* — Stephen M D Agosta
(74) *Attorney, Agent, or Firm* — Osha Bergman Watanabe & Burton LLP

(57) ABSTRACT

One aspect of a user terminal of the present disclosure includes: a transmission section that transmits information regarding a new candidate beam in a case where a beam failure of a given cell is detected; and a control section that uses a given reference signal as a reference signal for the new candidate beam in a case where the reference signal for the new candidate beam is not configured.

4 Claims, 9 Drawing Sheets

(56) References Cited

U.S. PATENT DOCUMENTS

| | | | |
|---|---|---|---|
| 2019/0052339 A1* | 2/2019 | Zhou | H04W 76/19 |
| 2019/0052341 A1* | 2/2019 | Furuskog | H04W 16/28 |
| 2019/0053314 A1* | 2/2019 | Zhou | H04B 7/0695 |
| 2019/0081687 A1* | 3/2019 | Sadiq | H04W 76/19 |
| 2019/0081753 A1* | 3/2019 | Jung | H04B 7/088 |
| 2019/0159100 A1* | 5/2019 | Liou | H04L 1/0025 |
| 2019/0166555 A1* | 5/2019 | Cheng | H04W 72/23 |
| 2019/0190582 A1* | 6/2019 | Guo | H04L 1/0061 |
| 2019/0199419 A1* | 6/2019 | Teslenko | H04B 7/0617 |
| 2019/0200248 A1* | 6/2019 | Basu Mallick | H04B 7/088 |
| 2019/0200392 A1* | 6/2019 | Agiwal | H04W 72/23 |
| 2019/0230529 A1* | 7/2019 | Sadiq | H04W 24/04 |
| 2019/0253949 A1* | 8/2019 | Park | H04W 36/0077 |
| 2019/0306875 A1* | 10/2019 | Zhou | H04B 7/0695 |
| 2019/0313264 A1* | 10/2019 | Lin | H04W 24/08 |
| 2020/0045745 A1* | 2/2020 | Cirik | H04W 24/08 |
| 2020/0084089 A1* | 3/2020 | Da Silva | H04W 24/08 |
| 2020/0127883 A1* | 4/2020 | Liu | H04L 41/0686 |
| 2020/0145280 A1* | 5/2020 | Cirik | H04B 7/0695 |
| 2020/0323009 A1* | 10/2020 | Jiang | H04W 76/18 |
| 2020/0350972 A1* | 11/2020 | Yi | H04L 1/12 |
| 2020/0374853 A1* | 11/2020 | Guan | H04B 7/0695 |
| 2020/0404559 A1* | 12/2020 | Koskela | H04B 7/088 |
| 2020/0404638 A1* | 12/2020 | Deogun | H04W 76/19 |
| 2020/0413469 A1* | 12/2020 | Wu | H04W 36/305 |
| 2021/0028849 A1* | 1/2021 | Chin | H04B 7/06964 |
| 2021/0037590 A1* | 2/2021 | Yang | H04W 76/18 |
| 2021/0044344 A1* | 2/2021 | Jiang | H04W 74/0833 |
| 2021/0058998 A1* | 2/2021 | Yuan | H04B 7/0695 |
| 2021/0058999 A1* | 2/2021 | Chen | H04W 72/23 |
| 2021/0068162 A1* | 3/2021 | Agiwal | H04L 5/0023 |
| 2021/0083751 A1* | 3/2021 | Chen | H04W 72/23 |
| 2021/0105171 A1* | 4/2021 | Chen | H04B 7/0695 |
| 2021/0144808 A1* | 5/2021 | Zhang | H04W 88/06 |
| 2021/0337453 A1* | 10/2021 | Gao | H04W 36/305 |
| 2022/0224393 A1* | 7/2022 | Gao | H04W 76/19 |
| 2022/0239437 A1* | 7/2022 | Matsumura | H04L 5/0051 |
| 2022/0311501 A1* | 9/2022 | Koskela | H04W 76/19 |
| 2023/0262746 A1* | 8/2023 | Hong | H04W 74/006 370/329 |

OTHER PUBLICATIONS

Intel Corporation, "Summary 2 on L1-SINR and SCell BFR", 3GPP TSG RAN WG1 Meeting #97, R1-1907892, Reno, USA, May 13-17, 2019 (22 pages).

Nokia, Nokia Shanghai Bell, "SCell Beam Failure Recovery", 3GPP TSG-RAN WG2 Meeting #102, R2-1808024, Busan, South Korea, May 21-25, 2018 (2 pages).

International Search Report issued in PCT/JP2019/021851 on Nov. 26, 2019 (2 pages).

Written Opinion of the International Searching Authority issued in PCT/JP2019/021851 on Nov. 26, 2019 (4 pages).

Intel Corporation; "Summary of Discussion for NR Radio Link Monitoring"; 3GPP TSG RAN WG1 Meeting #90bis, R1-1721369; Prague, Czech Republic; Oct. 9-13, 2017 (9 pages).

Huawei, HiSilicon; "Remaining details on beam failure recovery"; 3GPP TSG RAN WG1 Meeting 91, R1-1719423; Reno, USA; Nov. 27-Dec. 1, 2017 (10 pages).

Ericsson; "Details on lower-layer mobility enhancements"; 3GPP TSG-RAN WG1 Meeting #97, Tdoc R1-1907435; Reno, USA; May 13-17, 2019 (9 pages).

Huawei, HiSilicon; "Remaining issues for physical downlink control channel"; 3GPP TSG RAN WG1 Meeting #94bis, R1-1810111; Chengdu, China; Oct. 8-12, 2018 (7 pages).

Intel Corporation; "Summary on L1-SINR and SCell BFR"; 3GPP TSG RAN WG1 Meeting #97, R1-1907674; Reno, USA; May 13-17, 2019 (22 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).

Office Action issued in Indian Application No. 202117054956, dated Jun. 26, 2023 (8 pages).

Office Action issued in Chinese Application No. 201980099096.2, dated Jun. 29, 2023 (13 pages).

Office Action issued in Chinese Application No. 201980099096.2; Dated Dec. 13, 2023 (10 pages).

Hearing Notice issued in counterpart Indian Application No. 202117054956, mailed Mar. 7, 2024 (2 pages).

* cited by examiner

USER TERMINAL AND RADIO COMMUNICATION METHOD

TECHNICAL FIELD

The present disclosure relates to a user terminal and a radio communication method in a next-generation mobile communication system.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Further, specifications of LTE-Advanced (third generation partnership project (3GPP) Release. (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In existing LTE systems (LTE Rel. 8 to 14), radio link quality is monitored (radio link monitoring (RLM)). When a radio link failure (RLF) is detected by RLM, re-establishment of radio resource control (RRC) connection is requested of the user terminal (user equipment: UE).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (for example, NR), it has been studied to perform a procedure to detect a beam failure (BF) and switch to another beam (which may also be referred to as a beam failure recovery (BER) procedure, BFR, and the like). Further, in the BFR procedure, in a case where a beam failure has occurred, the UE reports a beam failure recovery request (BFRQ) to request recovery from the beam failure.

Further, in the BFR procedure, it has been studied that the UE reports information regarding a new candidate beam (also referred to as a new candidate beam). The network (for example, a base station) can appropriately recover the beam failure by newly configuring the new candidate beam reported from the UE.

However, how to configure a reference signal for the new candidate beam and the like in the BFR procedure has not been sufficiently studied. If the BFR procedure is not appropriately performed, there is a possibility of causing a decrease in performance of a system, such as a delay of the BFR.

Thus, an object of the present disclosure is to provide a user terminal and a radio communication method for appropriately performing the BFR procedure.

Solution to Problem

A user terminal according to one aspect of the present disclosure includes: a transmission section that transmits information regarding a new candidate beam in a case where a beam failure of a given cell is detected; and a control section that uses a given reference signal as a reference signal for the new candidate beam in a case where the reference signal for the new candidate beam is not configured.

Advantageous Effects of Invention

According to one aspect of the present disclosure, the BFR procedure can be appropriately performed.

DESCRIPTION OF EMBODIMENTS

<Beam Failure Recovery>

In NR, communication using beam forming has been studied. For example, a UE and a base station (for example, gNodeB (gNB)) may use a beam used for signal transmission (which is also referred to as a transmission beam, a Tx beam, or the like) or a beam used for signal reception (which is also referred to as a reception beam, an Rx beam, or the like).

In a case where beam forming is used, degradation of radio link quality is assumed because it becomes susceptible to interference by an obstacle. A radio link failure (RLF) may frequently occur due to degradation of the radio link quality. When the RLF occurs, cell re-connection is required, and thus frequent occurrence of the RLF leads to degradation of system throughput.

In the NR, to suppress the occurrence of the RLF, it has been studied to perform a procedure of switching to another beam (which may also be referred to as beam recovery (BR), beam failure recovery (BFR), Layer 1/Layer 2 (L1/L2) beam recovery, or the like) in a case where quality of a specific beam degrades. Note that the BFR procedure may also be simply referred to as BFR.

Note that a beam failure (BF) in the present disclosure may be referred to as a link failure, a radio link failure (RLF).

Figure 1:
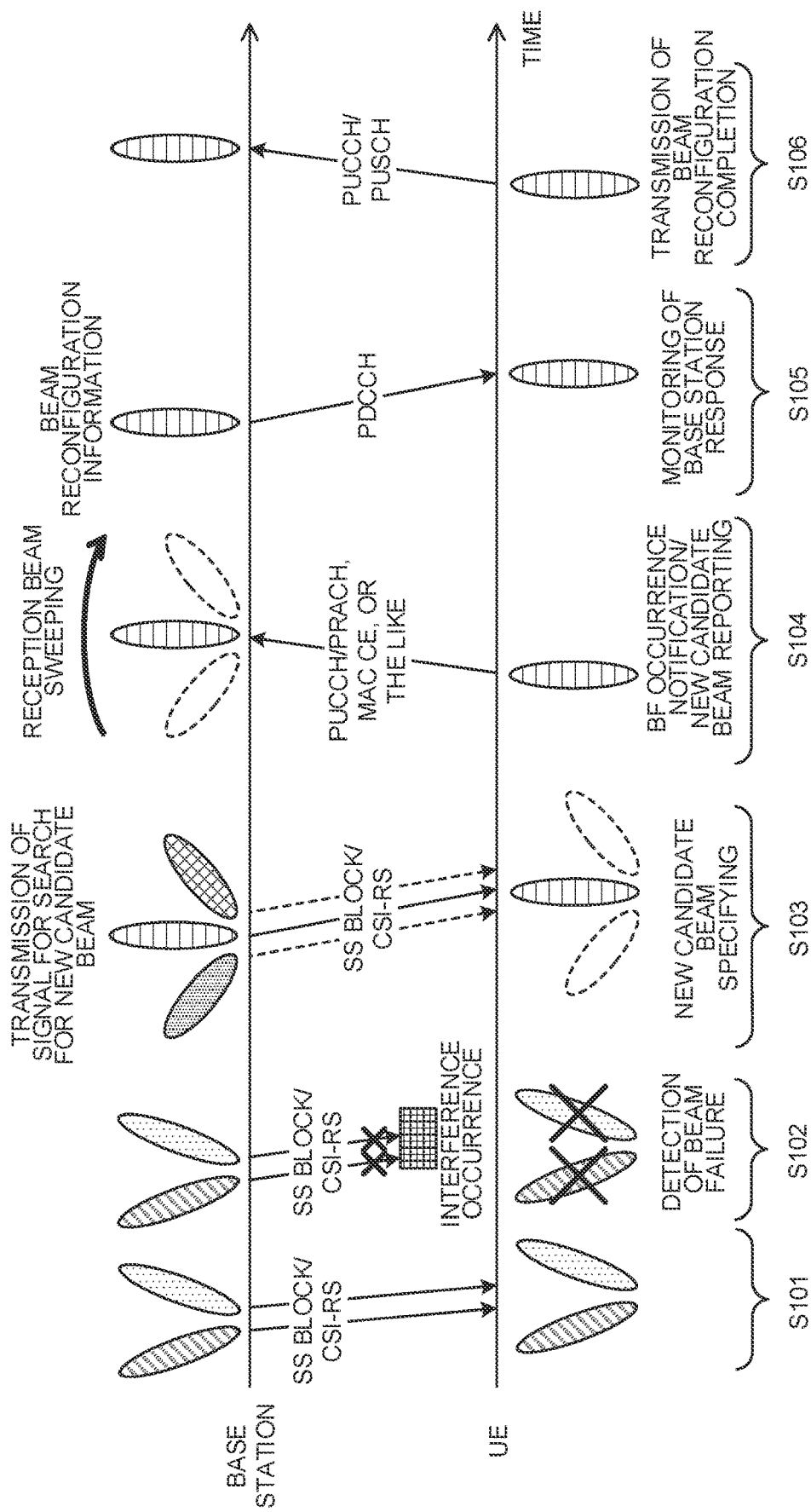
FIG. 1 is a diagram illustrating an example of a BFR procedure in Rel. 15 NR.

FIG. 1 is a diagram illustrating an example of a beam recovery procedure in Rel. 15 NR. The number of beams, or the like, is an example, and is not limited thereto. In an initial state (step S101) in FIG. 1, the UE performs measurement based on a reference signal (RS) resource transmitted using two beams.

The RS may be at least one of a synchronization signal block (SSB) or a channel state information RS (CSI-RS). Note that an SSB may also be referred to as an SS/physical broadcast channel (PBCH) block, or the like.

The RS may be at least one of a primary synchronization signal (primary SS (PSS)), a secondary synchronization signal (secondary SS (SSS)), a mobility reference signal (mobility RS (MRS)), a signal included in an SSB, the SSB, a CSI-RS, a demodulation reference signal (DMRS), a beam-specific signal, or the like, or a signal configured by extending or changing these. The RS measured in step S101 may be referred to as an RS for beam failure detection (beam failure detection RS (BFD-RS)), or the like.

In step S102, interference in radio waves from the base station occurs, whereby the UE cannot detect the BFD-RS (or reception quality of the RS degrades). Such interference may occur due to, for example, an effect of an obstacle between the UE and the base station, fading, interference, or the like.

The UE detects a beam failure when a given condition is satisfied. For example, the UE may detect occurrence of a beam failure in a case where a block error rate (BLER) is less than a threshold value for all of the configured BFD-RS (BFD-RS resource configurations). When the occurrence of the beam failure is detected, a lower layer (physical (PHY) layer) of the UE may perform notification (indication) of a beam failure instance to a higher layer (MAC layer).

Note that a criterion for determination is not limited to the BLER, and may be reference signal received power in a physical layer (Layer 1 reference signal received power (L1-RSRP)). Further, instead of RS measurement or in addition to RS measurement, beam failure detection may be performed on the basis of a physical downlink control channel (PDCCH) or the like. The BFD-RS may be expected to be in a quasi-co-location (QCL) with a DMRS of the PDCCH monitored by the UE.

Here, the QCL is an indicator indicating a statistical property of a channel. For example, in a case where one signal/channel and another signal/channel have a QCL relation, this may mean that it is possible to assume that these multiple different signals/channels have at least one identical property out of a Doppler shift, a Doppler spread, an average delay, a delay spread, or a spatial parameter (for example, spatial Rx filter/parameter, spatial Tx (transmission) filter/parameter) (a QCL relation is established regarding at least one of these).

Note that the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

Information regarding the BFD-RS (for example, an RS index, resource, number, number of ports, precoding, or the like), information regarding beam failure detection (BFD) (for example, the above-described threshold value), or the like may be configured in (notified) the UE by using higher layer signaling, or the like. The information regarding the BFD-RS may also be referred to as information regarding a resource for BFR, or the like.

In the present disclosure, the higher layer signaling may be any of, for example, radio resource control (RRC) signaling, medium access control (MAC) signaling, broadcast information, and the like, or a combination thereof.

For example, a MAC control element (CE), a MAC protocol data unit (PDU), or the like may be used for the MAC signaling. The broadcast information may be, for example, a master information block (MIB), a system information block (SIB), remaining minimum system information (RMSI), other system information (OSI), and the like.

The MAC layer of the UE may start a given timer (which may also be referred to as a beam failure detection timer) in a case where a beam failure instance notification is received from the PHY layer of the UE. The MAC layer of the UE may trigger BFR (for example, start any one of random access procedures to be described later) after receiving the beam failure instance notification a certain number of times (for example, beamFailureInstanceMaxCount configured by RRC) or more before the timer expires.

The base station may determine that the UE has detected a beam failure in a case where there is no notification from the UE (for example, time for which there is no notification exceeds a given time) or in a case where a given signal (beam recovery request in step S104) is received from the UE.

In step S103, the UE starts a search for a new candidate beam to be newly used for communication for beam recovery. The UE may measure a given RS to select a new candidate beam corresponding to the RS. The RS measured in step S103 may be referred to as a new candidate beam identification RS (NCBI-RS), a CBI-RS, a candidate beam RS (CB-RS), or the like. The NCBI-RS may be the same as or different from the BFD-RS. Note that the new candidate beam may be referred to as a new candidate beam, a candidate beam, or a new beam.

The UE may determine a beam corresponding to an RS that satisfies a given condition as a new candidate beam. The UE may determine a new candidate beam on the basis of, for example, an RS whose L1-RSRP exceeds a threshold value among configured NCBI-RSs. Note that a criterion for determination is not limited to L1-RSRP. The determination may be made using at least any one of L1-RSRP, L1-RSRQ, or L1-SINR (signal to noise interference power ratio). L1-RSRP regarding an SSB may also be referred to as SS-RSRP. L1-RSRP regarding a CSI-RS may also be referred to as CSI-RSRP. Similarly, L1-RSRQ regarding an SSB may also be referred to as SS-RSRQ. L1-RSRQ regarding a CSI-RS may also be referred to as CSI-RSRQ. Further, similarly, L1-SINR regarding an SSB may be referred to as SS-SINR. L1-SINR regarding a CSI-RS may be referred to as CSI-SINR.

Information regarding an NCBI-RS (for example, an RS resource, number, number of ports, precoding, or the like), information regarding new candidate beam identification (NCBI) (for example, the above-described threshold value), or the like may be configured in (notified) the UE using higher layer signaling, or the like. The information regarding the NCBI-RS may be acquired on the basis of the information regarding the BFD-RS. The information regarding the NCBI-RS may also be referred to as information regarding an NCBI resource, or the like.

Note that the BFD-RS, NCBI-RS, or the like may be replaced with a radio link monitoring reference signal (RLM-RS).

In step S104, the UE that has specified the new candidate beam transmits a beam recovery request (beam failure recovery request (BFRQ)). The beam recovery request may be referred to as a beam recovery request signal, a beam failure recovery request signal, or the like.

The BFRQ may be transmitted using, for example, at least one of a physical uplink control channel (PUCCH), a physical random access channel (PRACH), a physical uplink shared channel (PUSCH), a configured grant PUSCH, or a MAC CE.

The BFRQ may include information on the new candidate beam specified in step S103. A resource for the BFRQ may be associated with the new candidate beam. Notification of the information on the beam may be performed using, for example, a beam index (BI), a port index of a given reference signal, a resource index (for example, CSI-RS resource indicator (CRI), SSB resource indicator (SSBRI)), or the like.

In the Rel. 15 NR, contention-based BFR (CB-BFR) that is BFR based on a contention-based random access (RA) procedure and contention-free BFR (CF-BFR) that is BFR based on a non-contention based random access procedure have been studied. In the CB-BFR or the CF-BFR, the UE may transmit a preamble (which is also referred to as an RA preamble, a physical random access channel (PRACH), an RACH preamble, or the like) as the BFRQ by using a PRACH resource.

Further, in the NR, a plurality of PRACH formats (PRACH preamble formats) have been studied. A random access (RA) preamble using each PRACH format includes a RACH OFDM symbol. Furthermore, the RA preamble may include at least one of a cyclic prefix (CP) or a guard period (GP). For example, PRACH formats 0 to 3 use a preamble sequence, which is a long sequence, in the RACH OFDM symbol. PRACH formats A1 to A3, B1 to B4, C0, and C2 use a preamble sequence, which is a short sequence, in the RACH OFDM symbol.

A frequency of a carrier may fall within a frequency range of either a frequency range (FR) 1 or a FR 2. The FR 1 may be a frequency range lower than a given frequency, and the FR 2 may be a frequency range higher than the given frequency.

Further, a resource can be set more flexibly in a time domain for the physical uplink control channel as compared with the PRACH. For that reason, it is conceivable to use the physical uplink control channel (PUCCH) as a channel to be used for BFRQ transmission. Further, a resource can be set more flexibly in a time domain for the MAC CE and PUSCH as compared with the PRACH. For that reason, it is also conceivable to use the MAC CE and the PUSCH as the channel to be used for the BFRQ transmission.

In step S105, the base station that has detected the BFRQ transmits a response signal (which may also be referred to as a "gNB response" or the like) for the BFRQ from the UE. The response signal may include reconfiguration information (for example, DL-RS resource configuration information) for one or a plurality of beams.

The response signal may be transmitted, for example, in a UE common search space of a PDCCH. Notification of the response signal may be performed using a PDCCH (DCI) with a cyclic redundancy check (CRC) scrambled by an identifier of the UE (for example, a cell-radio RNTI (C-RNTI)). The UE may determine at least one of a transmission beam or a reception beam to be used, on the basis of beam reconfiguration information.

The UE may monitor the response signal on the basis of at least either a control resource set (CORESET) for BFR or a search space set for BFR. For example, the UE may detect the DCI with the CRC scrambled with the C-RNTI in the BFR search space in a CORESET individually configured.

For the CB-BFR, contention resolution may be determined to be successful in a case where the UE receives a PDCCH corresponding to the C-RNTI regarding the UE itself.

Regarding the processing in step S105, a period may be set for the UE to monitor a response from the base station (for example, gNB) for the BFRQ. The period may also be referred to as, for example, a gNB response window, a gNB window, a beam recovery request response window, a BFRQ response window, or the like. The UE may retransmit the BFRQ in a case where no gNB response is detected within the window period.

In step S106, the UE may transmit a message indicating that beam reconfiguration is completed to the base station. The message may be transmitted by the PUCCH or PUSCH, for example.

In step S106, the UE may receive RRC signaling indicating a configuration of a TCI state used for the PDCCH, or may receive a MAC CE indicating activation of the configuration.

Beam recovery success (BR success) may represent a case where step S106 is reached, for example. On the other hand, beam recovery failure (BR failure) may correspond to, for example, a case where the number of times of BFRQ transmission has reached a given number, or a beam-failure-recovery-timer has expired.

Note that numbers of these steps are merely numbers for description, and a plurality of these steps may be combined, or the order of these steps may be changed. Further, whether or not to perform BFR may be configured in the UE by using higher layer signaling.

Meanwhile, it is specified that BFR is performed only on a given cell (for example, a primary cell) in a case where communication is performed using a plurality of cells in the existing LTE systems as described above, but an application of the BFR procedure to the plurality of cells has been studied in the NR.

Figure 2:
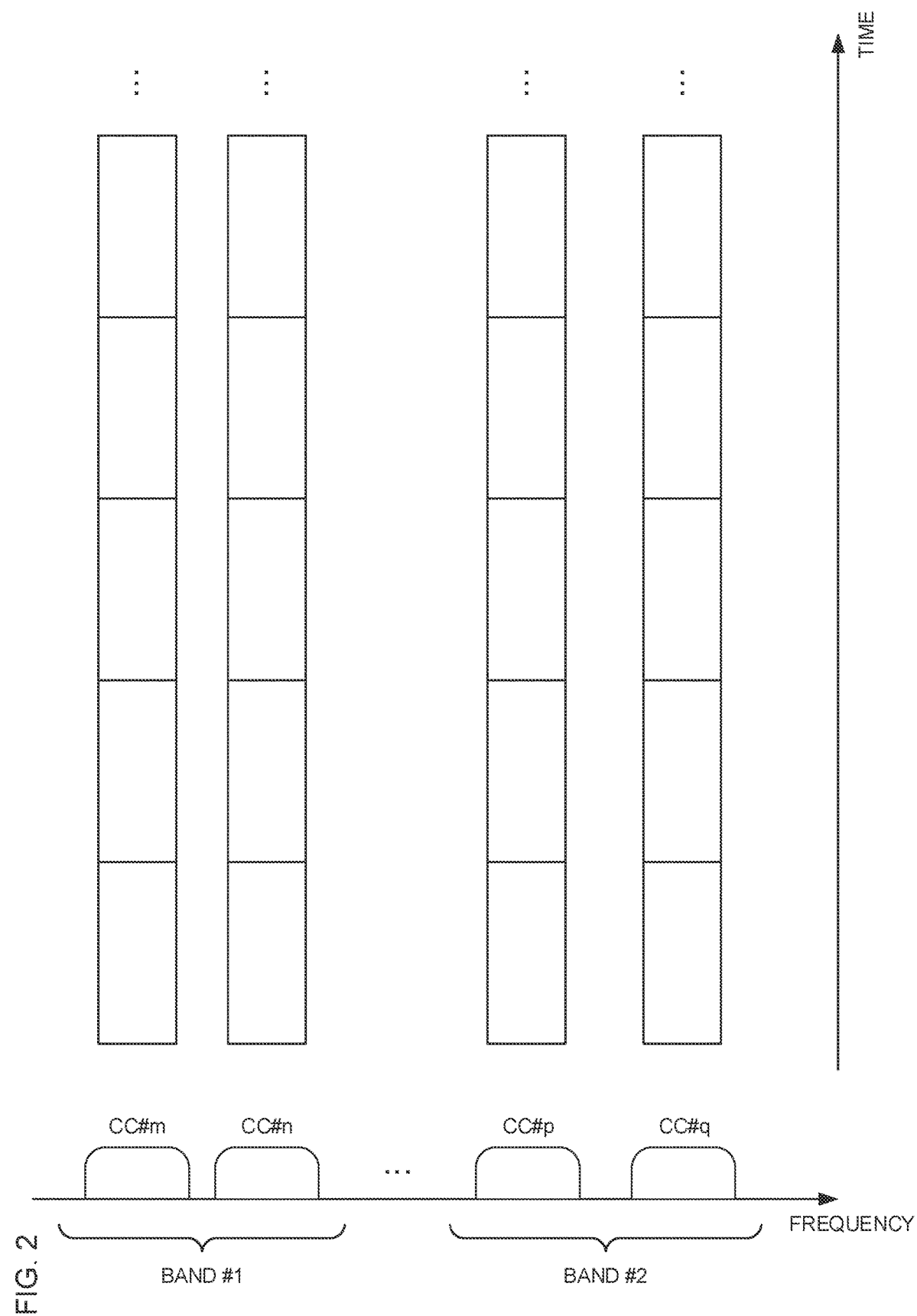
FIG. 2 is a diagram for describing intra-band CA and inter-band CA.

A configuration for performing communication using the plurality of cells is, for example, an intra-band carrier aggregation (CA) or an inter-band carrier aggregation (CA) (see FIG. 2).

FIG. 2 illustrates a case where a first band #1 and a second band #2 are used as a plurality of frequency bands. Note that the number of frequency bands applied is not limited to two, and the frequency band (or frequency domain) may be divided into three or more.

FIG. 2 illustrates a case where a CC #m and a CC #n are configured in the first band #1 and a CC #p and a CC #q are configured in the second band #2. CA between the CC #m and the CC #n or CA between the CC #m and the CC #n corresponds to the intra-band CA. On the other hand, CA between a CC (for example, the CC #m or the CC #n) configured in the first band #1 and a CC (for example, the CC #p or the CC #q) configured in the second band corresponds to the inter-band CA.

Further, the first band may correspond to a first frequency range (FR 1), and the second band may correspond to a second frequency range (FR 2). For example, the FR 1 may be a frequency range of 6 GHz or less (sub-6 GHz), and the FR 2 may be a frequency range higher than 24 GHz (above-24 GHz).

The FR 1 may be defined as a frequency range in which at least one of 15 kHz, 30 kHz, or 60 kHz is used as a subcarrier spacing (SCS), and the FR 2 may be defined as a frequency range in which at least one of 60 kHz or 120 kHz is used as the SCS. Note that the frequency ranges, definitions, and the like of the FR 1 and the FR 2 are not limited thereto, and, for example, the FR 1 may be a frequency range higher than the FR 2. For example, a cell using the FR 1 and a cell using the FR 2 may be configured to apply different numerologies (for example, subcarrier spacings or the like).

As described above, a case is assumed where the BFR procedure is applied to a plurality of cells (for example, SCells). In such a case, it is assumed that, in a case where a beam failure occurs in a certain cell, the UE transmits a BFRQ to a network (for example, a base station), and determines a new candidate beam to transmit information regarding the new candidate beam.

The UE needs to measure a given RS to determine the new candidate beam. However, in a case where the BFR procedure in the plurality of cells is supported, how to control a configuration of the RS to be used for determination of the new candidate beam or a method of determining the new candidate beam becomes a problem. For example, in a case where an RS for a new candidate beam is not configured, it is a problem which RS is applied to determine a new candidate beam to be reported.

The present inventors have studied configuration or selection of the RS for the new candidate beam and conceived the present invention.

Hereinafter, embodiments according to the present disclosure will be described in detail with reference to the drawings. The following aspects may be applied independently or may be applied in combination.

Note that L1-RSRP will be described as an example of a measurement type used for determining the new candidate beam in the following description, but an applicable measurement type is not limited thereto. In addition, L1-RSRQ and L1-SINR may be applied, or at least two of L1-RSRP, L1-RSRQ, L1-RSRQ, and L1-SINR may be applied in combination.

Further, in the following description, the RS for the new candidate beam may be replaced with an RS for determining a new candidate beam, an RS configured for determining a new candidate beam, and a new beam identification RS. Further, in the following description, a set (RS set) or a combination of reference signals may be simply replaced with a reference signal (RS), or the reference signal (RS) may be replaced with the set (RS set) or the combination of reference signals. Further, the reference signal (RS) may be replaced with at least one of an SSB, a CSI-RS, or a TRS.

(First Aspect)

In a first aspect, a description will be given of the configuration or selection of the RS for the new candidate beam in the BFR procedure of a given cell (for example, the SCell).

For example, the configuration or selection of the RS for the new candidate beam may be controlled using at least one of Cases 1 to 5 below.

<Case 1>

A configuration may be adopted in which the RS for the new candidate beam is always configured. For example, in a case where the BFR procedure (for example, BFD RS) of a given cell is configured, the UE may assume that the RS for the new candidate beam is always configured in the given cell (or another cell). The other cell may be a cell (or CC) belonging to the same band as the given cell.

The network (for example, a base station) configures the RS for the new candidate beam in the UE by higher layer signaling or the like. In a case where the RS for the new candidate beam is not configured, the UE may determine that the BFR procedure is in error. In this case, the UE may transmit information indicating that the new candidate beam cannot be grasped to the base station.

As described above, by adopting the configuration in which the RS for the new candidate beam is always configured in the BFR procedure of the given cell, it is possible to appropriately report information on the new candidate beam suitable for the UE to the base station on the basis of a measurement result of the RS for the new candidate beam in a case where a beam failure is detected.

In Cases 2 to 6 below, a case is assumed where the RS for the new candidate beam is not configured by higher layer signaling or the like.

<Case 2>

The RS for beam failure detection (BFD RS) may be applied as the RS for the new candidate beam. For example, the UE may determine that a new candidate beam RS is the same as the BFD RS in a case where the BFR procedure (for example, BFD RS) of the given cell is configured and the RS for the new candidate beam is not configured.

<Case 3>

As the RS for the new candidate beam, a given RS corresponding to a control resource set (or associated with a control resource set) may be applied. For example, in the case where the BFR procedure (for example, BFD RS) of the given cell is configured and the RS for the new candidate beam is not configured, the UE may recognize that the new candidate beam RS is the given RS corresponding to the control resource set configured in the cell.

The given RS may be, for example, a synchronization signal block (for example, an SSB or an SS/PBCH). Further, the control resource set may be some of control resource sets configured in the cell, or may be all control resource sets configured. Information regarding association between the control resource set and the given RS may be notified the UE from the base station by at least one of higher layer signaling or a MAC control signal.

As a result, even in a case where the RS for the new candidate beam is not configured in a case where the BFR procedure is configured, the UE can report the information regarding the new candidate beam to the base station by using the given RS.

<Case 4>

A set of given RSs (or a combination of given RSs) configured in a transmission configuration indication state (TCI state) of a downlink channel may be applied as the RS for the new candidate beam. For example, in the case where the BFR procedure (for example, BFD RS) of the given cell is configured and the RS for the new candidate beam is not configured, the UE may recognize that the new candidate beam RS is the set of given RSs configured in the cell (or another cell).

A downlink channel may be at least one of a downlink control channel (for example, a PDCCH) or a downlink shared channel (for example, a PDSCH). The given RS may be channel state information (for example, a CSI-RS). Further, the CSI-RS may be at least one of a periodic CSI-RS (for example, a P-CSI-RS), an aperiodic CSI-RS (for example, an A-CSI-RS), or a semi-persistent CSI-RS (for example, an SP-CSI-RS).

Further, the given RS may be an RS corresponding to the TCI state of the downlink channel (or the RS configured corresponding to the TCI state).

[Tci State]

The TCI state is information regarding quasi-co-location (QCL) of a signal/channel, and may also be referred to as, for example, a spatial Rx parameter, spatial relation information (SRI), or the like. The TCI state may be configured in the UE for each channel or each signal.

The QCL is an indicator indicating a statistical property of a signal/channel. For example, in a case where one signal/channel and another signal/channel have a QCL relation, this may mean that it is possible to assume that these multiple different signals/channels have at least one identical property out of a Doppler shift, a Doppler spread, an average delay, a delay spread, or a spatial parameter (for example, spatial Rx parameter) (a QCL relation is established regarding at least one of these).

Note that the spatial Rx parameter may correspond to a reception beam of the UE (for example, a reception analog beam), and the beam may be specified on the basis of spatial QCL. The QCL (or at least one element of the QCL) in the present disclosure may be replaced with the spatial QCL (sQCL).

A plurality of types of QCL (QCL types) may be defined. For example, four QCL types A to D with different parameters (or parameter sets) may be provided that can be assumed to be identical, and these parameters are indicated below:

QCL type A (QCL-A): Doppler shift, Doppler spread, average delay, and delay spread;
QCL Type B (QCL-B): Doppler shift and Doppler spread;
QCL type C (QCL-C): Doppler shift and average delay; and
QCL type D (QCL-D): Spatial Rx parameter.

It may be referred to as a QCL assumption for the UE to assume that a given control resource set (CORESET), channel, or reference signal has a specific QCL (for example, QCL type D) relation with another CORESET, channel, or reference signal.

The UE may determine at least one of a transmission beam (Tx beam) and a reception beam (Rx beam) of a signal/channel on the basis of a TCI state of the signal/channel or the QCL assumption.

The TCI state may be, for example, information regarding QCL between a target channel (in other words, a reference signal (RS) for the channel) and another signal (for example, another reference signal (RS)). The TCI state may be configured (indicated) by at least one of higher layer signaling (for example, RRC signaling), medium access control (MAC) signaling, or physical layer signaling.

For example, a MAC control element (MAC CE), a MAC protocol data unit (PDU), or the like may be used for the MAC signaling. The physical layer signaling may be, for example, downlink control information (DCI).

A channel for which the TCI state or spatial relation is configured (specified) may be, for example, at least one of a physical downlink shared channel (PDSCH)), a physical downlink control channel (PDCCH)), a physical uplink shared channel (PUSCH)), or a physical uplink control channel (PUCCH)).

Further, an RS having a QCL relation with the channel may be, for example, at least one of a synchronization signal block (SSB), a channel state information reference signal (CSI-RS), a sounding reference signal (SRS), a tracking CSI-RS (also referred to as a tracking reference signal (TRS)), a QCL detection reference signal (also referred to as a QRS), or the like.

An information element of the TCI state configured by higher layer signaling ("TCI-state IE" of RRC) may include one or a plurality of pieces of QCL information ("QCL-Info"). The QCL information may include at least one of information regarding the RS having a QCL relation (RS related information) and information indicating a QCL type (QCL type information). The RS related information may include information such as an index of the RS (for example, an SSB index or a non-zero-power (NZP) CSI-RS resource identifier (ID)), an index of a cell where the RS is located, or an index of a bandwidth part (BWP) where the RS is located.

Both an RS of the QCL type A and an RS of the QCL type D, or only the RS of the QCL type A may be configured for the UE as a TCI state of at least one of the PDCCH or the PDSCH.

In a case where a TRS is configured as the RS of the QCL type A, the TRS is different from a DMRS of the PDCCH or the PDSCH, and it is assumed that the same TRS is periodically transmitted for a long time. The UE can measure the TRS and calculate an average delay, a delay spread, and the like.

In the UE for which the TRS is configured as the RS of the QCL type A in the TCI state of the DMRS of the PDCCH or the PDSCH, it can be assumed that parameters (the average delay, the delay spread, and the like) of the QCL type A are the same between the DMRS of the PDCCH or the PDSCH and the TRS, and thus, the parameters (the average delay, the delay spread, and the like) of the type A of the DMRS of the PDCCH or the PDSCH can be obtained from a measurement result of the TRS. When performing channel estimation of at least one of the PDCCH or the PDSCH, the UE can perform channel estimation with higher accuracy using the measurement result of the TRS.

The UE for which the RS of the QCL type D is configured can determine a UE reception beam (spatial domain reception filter, UE spatial domain reception filter) by using the RS of the QCL type D.

[TCI State for PDCCH]

Information regarding QCL between a PDCCH (or a demodulation reference signal (DMRS) antenna port related to the PDCCH) and a given RS may be referred to as a TCI state for the PDCCH.

The UE may determine a TCI state for a UE-specific PDCCH (CORESET) on the basis of higher layer signaling. For example, for the UE, one or a plurality of (K) TCI states may be configured by RRC signaling for each CORESET.

In the UE, one of the plurality of TCI states configured by the RRC signaling may be activated by a MAC CE, for each CORESET. The MAC CE may be referred to as a TCI state indication for UE-specific PDCCH MAC CE. The UE may monitor a CORESET on the basis of an active TCI state corresponding to the CORESET.

[TCI State for PDSCH]

Information regarding QCL between a PDSCH (or a DMRS antenna port related to the PDSCH) and a given RS may be referred to as a TCI state for the PDSCH.

The UE may be notified (configured) of M (M≥1) TCI states for PDSCHs (QCL information for M PDSCHs) by higher layer signaling. Note that, the number M of TCI states configured in the UE may be limited by at least one of the UE capability or the QCL type.

DCI used for PDSCH scheduling may include a given field (which may be referred to as, for example, a TCI field, a TCI state field, or the like) indicating a TCI state for the PDSCH. The DCI may be used for PDSCH scheduling of one cell, and may be referred to as, for example, DL DCI, DL assignment, DCI format 1_0, DCI format 1_1, or the like.

Whether or not the TCI field is included in the DCI may be controlled by information of which the UE is notified from the base station. The information may be information (for example, TCI presence information, in-DCI TCI presence information, a higher layer parameter TCI-PresentInDCI) indicating whether the TCI field is present or absent in the DCI. The information may be configured in the UE by, for example, higher layer signaling.

In a case where more than eight types of TCI states are configured in the UE, a MAC CE may be used to activate (or specify) eight or less TCI states. The MAC CE may be referred to as a TCI states activation/deactivation for UE-specific PDSCH MAC CE. A value of the TCI field in the DCI may indicate one of the TCI states activated by the MAC CE.

In a case where the TCI presence information set as "enabled" is configured in the UE for a CORESET for scheduling a PDSCH (CORESET used for PDCCH transmission for scheduling the PDSCH), the UE may assume that the TCI field is present in the DCI format 1_1 of the PDCCH transmitted on the CORESET.

In a case where the TCI presence information is not configured for the CORESET for scheduling a PDSCH, or the PDSCH is scheduled by the DCI format 1_0, in a case where a time offset between reception of DL DCI (DCI for scheduling the PDSCH) and reception of a PDSCH corresponding to the DCI is greater than or equal to a threshold value, the UE, to determine QCL of a PDSCH antenna port, may assume that a TCI state or a QCL assumption for the PDSCH is the same as a TCI state or a QCL assumption applied to a CORESET used for PDCCH transmission for scheduling the PDSCH.

For example, the UE may use a set of (for example, 64) given RSs corresponding to a TCI state configured by higher layer signaling as RSs for new candidate beams. In this case, the UE may select a given RS (for example, an RS with the highest RSRP) satisfying a given condition from a given RS set and report information (for example, an RS index) regarding the given RS to the base station.

Alternatively, the UE may use, as RSs for new candidate beams, a set of (for example, 8) RSs activated by the MAC CE in a set of RSs configured in higher layer signaling.

As described above, even in a case where an RS for a new candidate beam is not configured in a case where the BFR procedure is configured, the UE can report the information regarding the new candidate beam to the base station by using the set of given RSs.

<Case 5>

A set of given RSs configured in a given cell (or a given CC) or a set of given RSs configured in another cell may be applied as the RS for the new candidate beam. For example, in the case where the BFR procedure (for example, BFD RS) of the given cell is configured and the RS for the new candidate beam is not configured, the UE may recognize that the new candidate beam RS is the set of given RSs configured in the cell (or another cell).

A given RS may be a synchronization signal block (for example, an SSB or an SS/PBCH). The other cell may be a cell (or CC) belonging to the same band as the given cell. Information regarding the SSB configured in each cell may be notified the UE from the base station by at least one of higher layer signaling or a MAC control signal.

As a result, even in a case where the RS for the new candidate beam is not configured in a case where the BFR procedure is configured, the UE can report the information regarding the new candidate beam to the base station by using the set of given RSs.

Further, in a case where the given cell and the other cell have a given QCL relation (for example, a type D-QCL relation), the UE may be configured to be able to use a given RS of another cell as the RS for the new candidate beam. As a result, in a case where a beam failure occurs in the given cell, a new candidate beam can be selected on the basis of the RS for the new candidate beam of the other cell having the given QCL relation, so that the new candidate beam can be appropriately selected.

(Second Aspect)

In a second aspect, a description will be given of a specific example of the configuration or selection of the RS for the new candidate beam in the BFR procedure of a given cell (for example, the SCell). Note that, in the following description, at least one of Cases 1 to 5 described in the first aspect can be applied in combination.

<Aspect 1>

Figure 3:
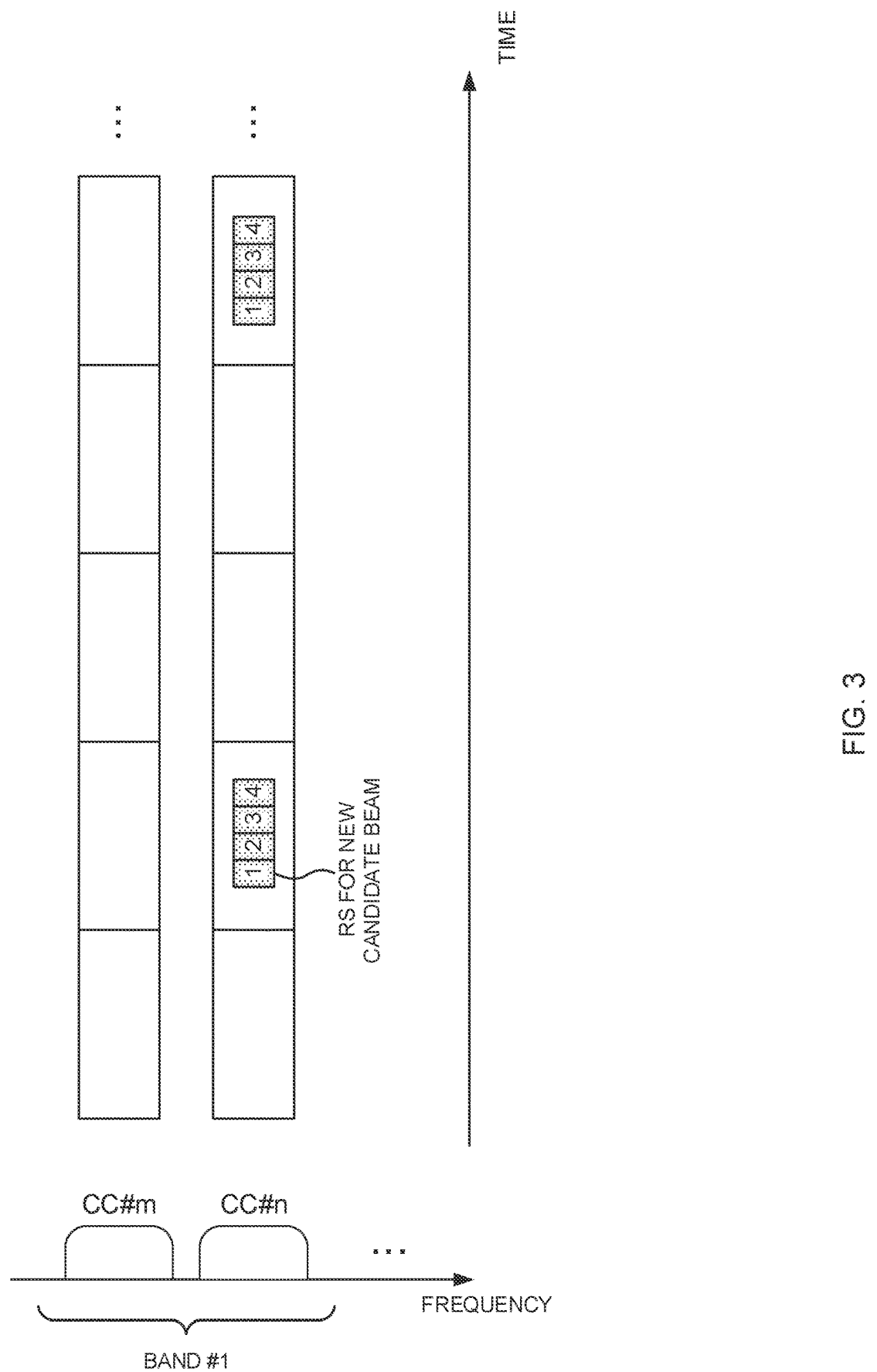
FIG. 3 is a diagram illustrating an example of configuration or selection of an RS for a new candidate beam.

FIG. 3 illustrates an example of a case where the RS for the new candidate beam is not configured in one CC (here, CC #m) out of the CC #m (or a cell #m) and the CC #n (or a cell #n), and the RS for the new candidate beam is configured in the other CC (here, CC #n). Further, the CC #m and the CC #n may be CCs belonging to the same frequency band. Alternatively, the CC #m and the CC #n may be CCs to which intra-band CA (intra-band CA) is applied.

In a case where a beam failure is detected in the CC #m, the UE reports detection of the beam failure and reports information regarding the new candidate beam to the base station. Note that the detection of the beam failure and reporting of the information regarding the new candidate beam may be performed at different timings, or may be performed at the same timing. Reporting of the beam failure or reporting of the information regarding the new candidate beam may be performed using the CC #m, or may be performed using another CC (for example, the CC #n).

The information regarding the new candidate beam may be information indicating a given RS index or a beam index. Alternatively, the information regarding the new candidate beam may be information indicating that there is no new candidate beam (for example, there is no beam or RS satisfying a given condition (for example, RSRP is greater than or equal to a given value)).

In a case where the beam failure is detected, the UE determines a given RS (for example, an index) for the new candidate beam to be reported on the basis of the RS for the new candidate beam. In a case where the RS for the new candidate beam is configured by higher layer signaling or the like in a CC (for example, the CC #m) in which the beam failure is detected, a given RS index is determined depending on a measurement result (for example, at least one of RSRP, RSSI, RSRQ, or SINR) of the configured RS for the new candidate beam.

In a case where the RS for the new candidate beam is not configured in the CC #m (or not present), the UE may use the RS for the new candidate beam configured in another CC (for example, the CC #n). That is, the UE may determine that a set of RSs for new candidate beams in the CC #m is an RS set for the new candidate beam configured in the CC #n. As a result, even in a case where the RS for the new candidate beam is not configured in the CC #m, it is possible to report the information regarding the new candidate beam with respect to the beam failure occurring in the CC #m.

Note that, in a case where the RS for the new candidate beam is configured in a plurality of CCs other than the CC #m, the UE may apply the RS for the new candidate beam configured in a given CC among the plurality of CCs as the RS for the new candidate beam in the CC #m. The given CC may be determined on the basis of a CC index (or a cell index), may be determined on the basis of information of which the base station notifies, or may be determined on the basis of the type of a CC (or a cell).

For example, the UE may determine the RS for the new candidate beam configured with a CC having the minimum (or maximum) CC index as the RS for the new candidate beam in the CC #m. Alternatively, the UE may determine the RS for the new candidate beam configured by a given type CC (for example, PCell or PSCell) as the RS for the new candidate beam in the CC #m. Alternatively, the base station may notify the UE of the CC used as the RS for the new candidate beam of the CC #m.

Alternatively, in a case where a given RS configured in the CC #m and the RS for the new candidate beam configured in the CC #n have a given QCL relation, the UE may use the given RS configured in the CC #m as the RS for the new candidate beam.

<Aspect 2>

Figure 4:
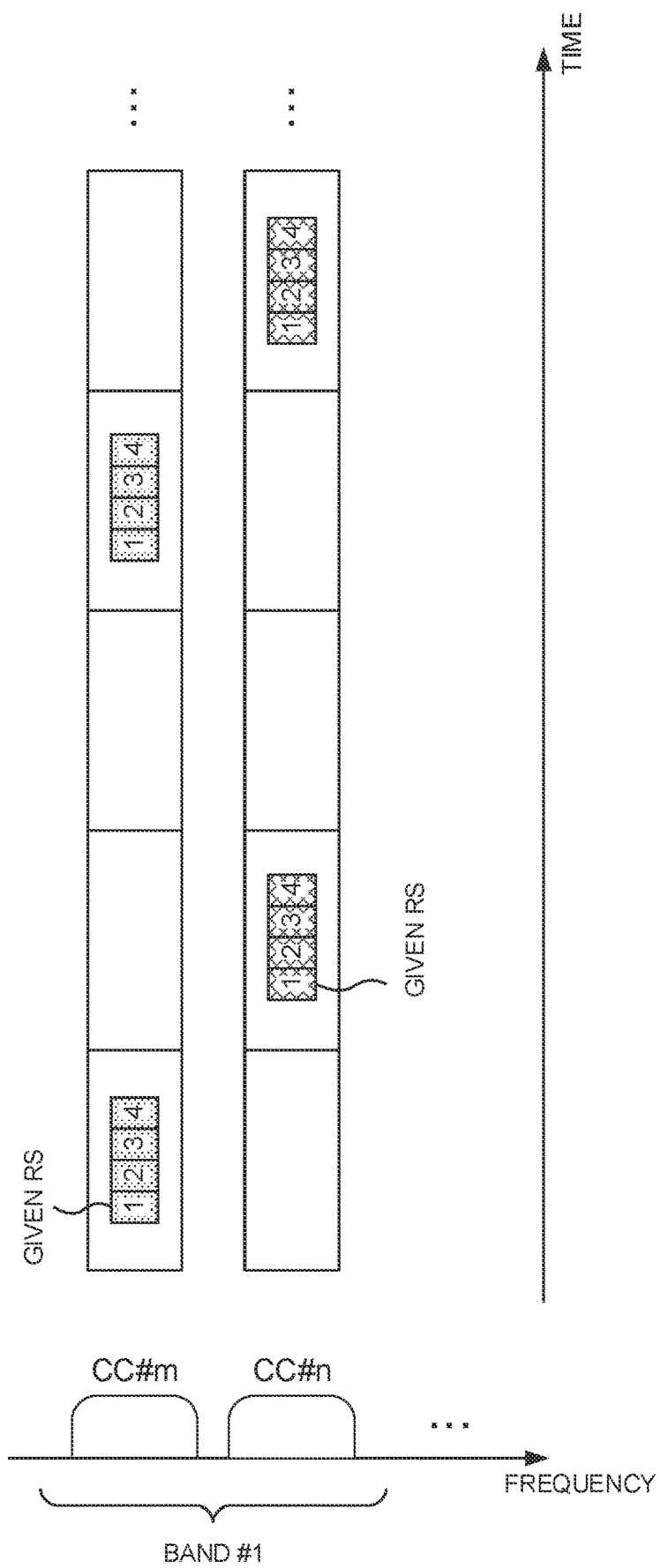
FIG. 4 is a diagram illustrating another example of the configuration or selection of the RS for the new candidate beam.

FIG. 4 illustrates an example of a case where the RS for the new candidate beam is not configured in at least one CC (here, the CC #n) out of the CC #m (or the cell #m) and the CC #n (or the cell #n). Further, a case is illustrated where a given RS (or RS set) is configured in the CC #m and the CC #n. The given RS set configured in the CC #m may be the RS for the new candidate beam, or may be another RS set.

Here, a case is assumed where it is configured that the TCI state of the PDCCH of the CC #m is in QCL ({QCL-A: TRS of CC #m, QCL-D: TRS of CC #m}) with respect to a reference signal (TRS) of the CC #m.

Further, two cases are assumed, a case (case A) where it is configured that the TCI state of the PDCCH of CC #n is in QCL ({QCL-A: TRS of CC #n, QCL-D: TRS of CC #n}) with respect to the reference signal (TRS) of the CC #n and a case (case B) where it is configured that a part (for example, QCL-D) is in QCL ({QCL-A: TRS of CC #n, QCL-D: TRS of CC #m}) with respect to the reference signal (TRS) of the CC #m.

In a case where a beam failure is detected in the CC #n (or a BFD RS is configured in the CC #n), the UE reports detection of the beam failure and reports information regarding the new candidate beam to the base station.

On the other hand, a case is assumed where the RS for the new candidate beam is not configured (or not present) in the CC #n. In such a case, the UE may apply at least one of an option A or an option B below.

[Option A]

In a case where a given RS (or given RS set) is configured in the CC #n, the UE may use the given RS as the RS for the new candidate beam in the CC #n. The given RS corresponds to an RS configured in the UE, not as the RS for the new candidate beam. That is, the UE may determine that the given RS set configured in the CC #n is a set of RSs for new candidate beams in the CC #n.

In this case, the UE can determine the new candidate beam to be reported on the basis of the given RS configured in the CC #n in which the beam failure is detected.

[Option B]

In a case where a given RS (or a given RS set) is configured in another CC (for example, the CC #m), the given RS may be used as the RS for the new candidate beam in the CC #n. That is, the UE may determine that the set of RSs for new candidate beams in the CC #n is the given RS set configured in the CC #m.

The CC #m and the CC #n may be CCs belonging to the same frequency band. Alternatively, the CC #m and the CC #n may be CCs to which intra-band CA (intra-band CA) is applied. In this case, the UE can determine the new candidate beam to be reported on the basis of a given RS configured in a CC (for example, the CC #n) different from the CC #n in which the beam failure is detected.

Note that a given RS configured in the CC #n and a given RS (for example, the RS for the new candidate beam or an RS for another application) configured in another CC (for example, the CC #m) may have a given QCL relation (for example, the case B). For example, the option B may be limited to a case (for example, the case B) where the CC #n and another CC (for example, the CC #m) have the given QCL relation. In this case, the UE may control the case A not to apply the option B.

Further, the UE may switch and apply the option A and the option B depending on the case A and the case B. Alternatively, regardless of the case, one of the option A or the option B may be applied. At least one of the cases and options to be applied may be configured in the UE from the base station.

<Aspect 3>

Figure 5:
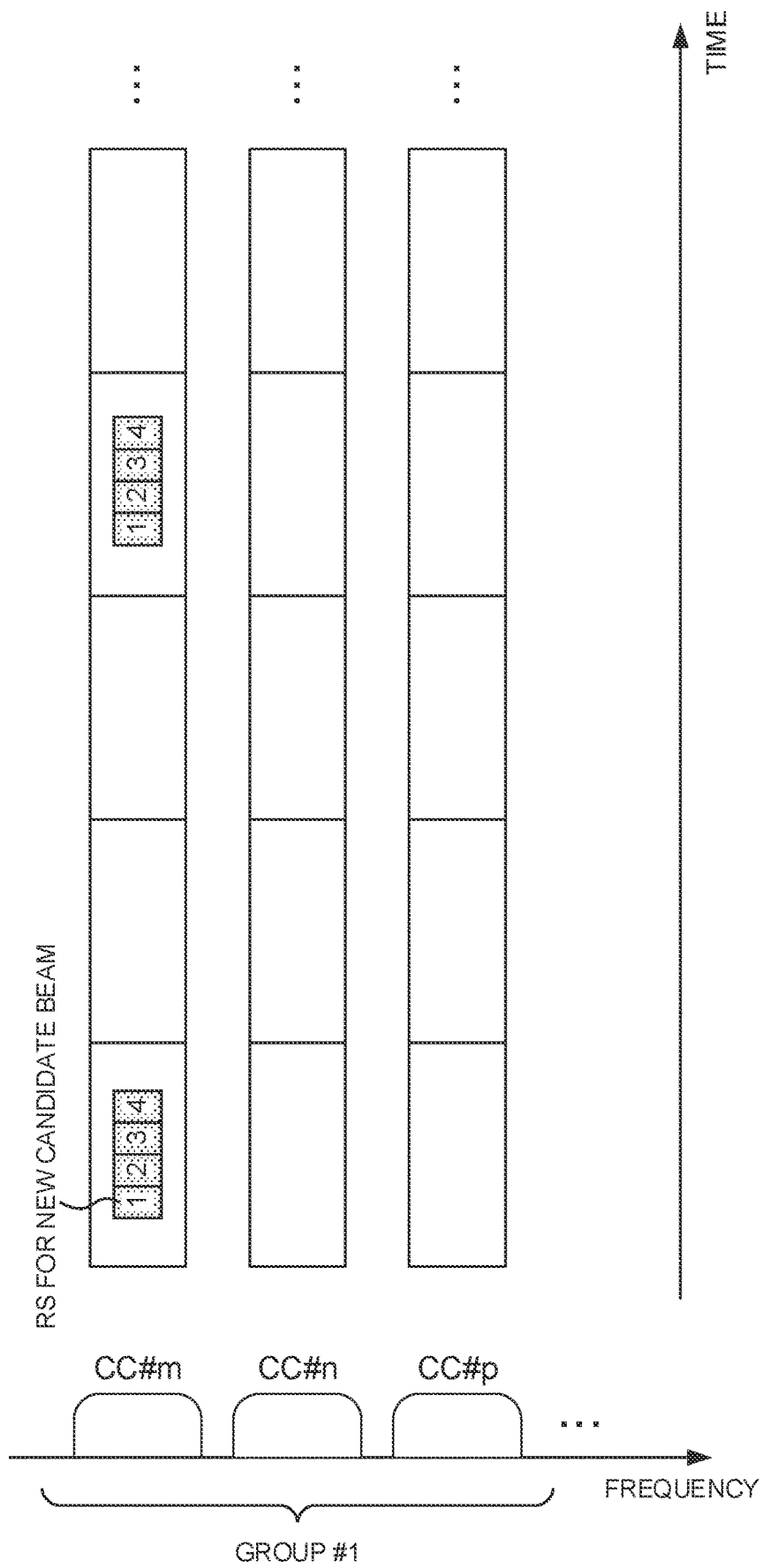
FIG. 5 is a diagram illustrating another example of the configuration or selection of the RS for the new candidate beam.

FIG. 5 illustrates an example of a case where a plurality of CCs (for example, the CC #m, the CC #n, the CC #p) is grouped and an RS for a new candidate beam is configured in at least one CC included in the group. Here, a case is illustrated where the RS for the new candidate beam is configured in the CC #m and the RS for the new candidate beam is not configured in the CC #n and CC #p. Note that the number of CCs in which the RS for the new candidate beam is configured is not limited to one.

The UE may assume that a plurality of CC groups is configured and the RS for the new candidate beam is configured in at least one CC included in the CC group. Information regarding the CC group may be configured in the UE from the base station by using higher layer signaling or the like.

Alternatively, the UE may assume that all configured SCells are included in the same group. Alternatively, the UE may assume that SCells included in a given range (for example, the same frequency band or a secondary cell group) are included in the same group.

Further, the base station may notify the UE of information regarding the CC in which the RS for the new candidate beam is configured in the group by higher layer signaling or the like. Alternatively, the base station may notify the UE of information regarding a given RS applied as the RS for the new candidate beam in each CC included in the group (for example, an RS index, or information regarding a CC in which the given RS is configured, or the like) by higher layer signaling or the like.

In a case where the RS for the new candidate beam is not configured in the CC #n in which the beam failure occurs (or the BFD RS is configured), the UE may use the RS for the new candidate beam configured in another CC (for example, CC #m). That is, the UE may determine that the set of RSs for new candidate beams in the CC #n is the RS set for the new candidate beam configured in another CC #m included in the same CC group #1.

Alternatively, the UE may determine that the set of RSs for new candidate beams in the CC #n is the given RS set configured in the CC #n or the given RS set configured in another CC #m included in the same CC group #1.

As described above, by using the RS for the new candidate beam of another CC included in the same CC group, or the given RS set, as the RS for the new candidate beam of the given CC, it becomes unnecessary to configure the RS for the new candidate beam in each CC. As a result, utilization efficiency of the resources can be improved.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 6:
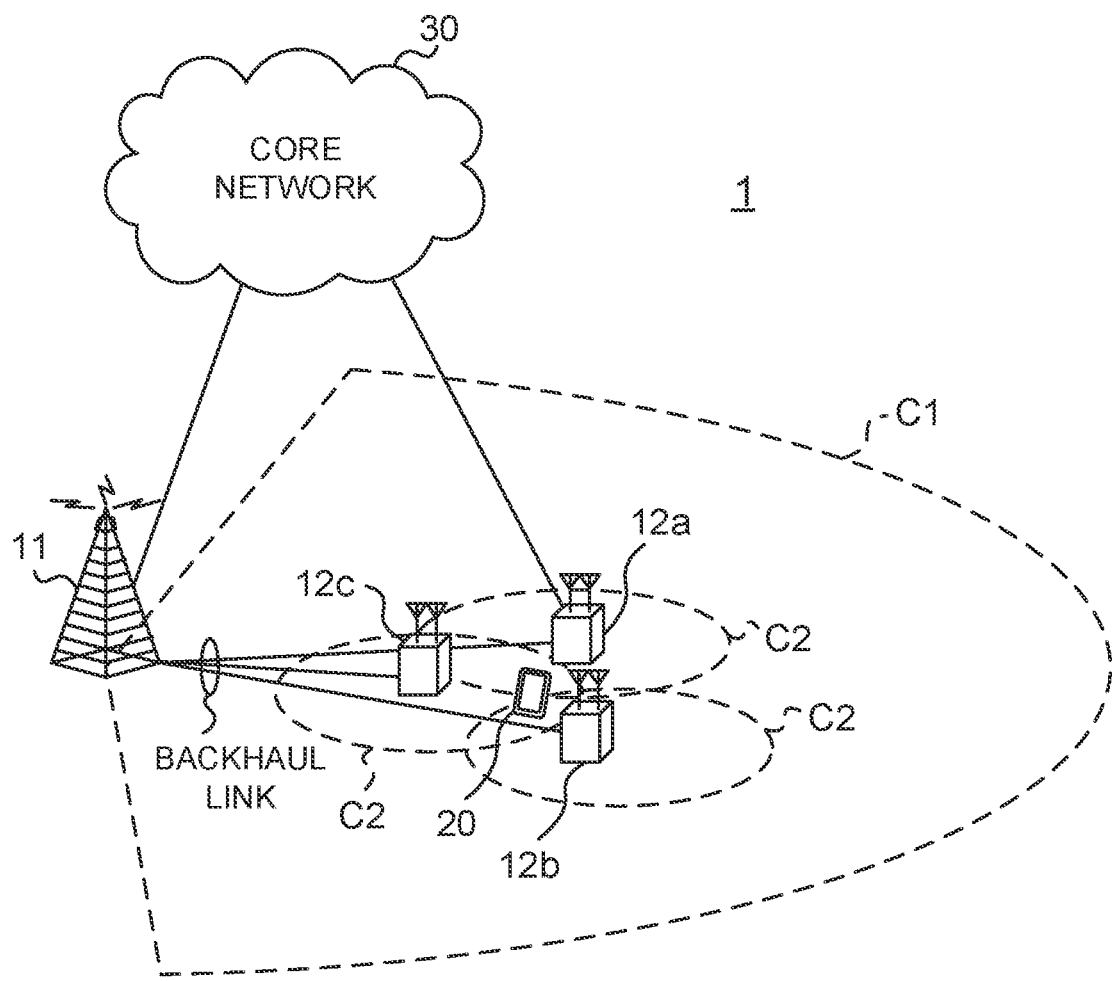
FIG. 6 is a diagram illustrating an example of a schematic configuration of a radio communication system according to one embodiment.

FIG. 6 is a diagram illustrating an example of a schematic configuration of a radio communication system according to one embodiment. A radio communication system 1 may be a system that implements communication by using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is a MN, and an LTE (E-UTRA) base station (eNB) is a SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged within the macro cell C1 and that form small cells C2 narrower than the macro cell C1. A user terminal 20 may be located in at least one cell. The arrangement, number, and the like of cells and the user terminals 20 are not limited to the aspects illustrated in the figure. Hereinafter, the base stations 11 and 12 will be collectively referred to as "base stations 10" in a case where these are not distinguished from each other.

The user terminal 20 may be connected to at least one of the plurality of base stations 10. The user terminal 20 may use at least one of carrier aggregation (CA) using a plurality of component carriers (CC) or dual connectivity (DC).

Each CC may be included in at least one of a frequency range 1 (FR 1) or a second frequency range 2 (FR 2). The macro cell C1 may be included in the FR 1, and the small cell C2 may be included in the FR 2. For example, the FR 1 may be a frequency range of 6 GHz or less (sub-6 GHz), and the FR 2 may be a frequency range higher than 24 GHz (above-24 GHz). Note that the frequency ranges, definitions, and the like of the FR 1 and FR 2 are not limited thereto, and, for example, the FR 1 may correspond to a frequency range higher than the FR 2.

Further, the user terminal 20 may perform communication in each CC using at least one of time division duplex (TDD) or frequency division duplex (FDD).

The plurality of base stations 10 may be connected to each other by wire (for example, an optical fiber or an X2 interface in compliance with common public radio interface (CPRI)) or by radio (for example, NR communication). For example, in a case where the NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), a next generation core (NGC), or the like.

The user terminal 20 may be a terminal corresponding to at least one of communication methods such as LTE, LTE-A, or 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), or the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

Further, in the radio communication system 1, as an uplink channel, a physical uplink shared channel (PUSCH) shared by the user terminals 20, a physical uplink control channel (PUCCH), a physical random access channel (PRACH), or the like may be used.

The PDSCH transmits user data, higher layer control information, a system information block (SIB), and the like. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH or the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET related to a certain search space on the basis of search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACK), ACK/NACK, or the like), scheduling request (SR), or the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) or a secondary synchronization signal (SSS). A signal block including the SS (PSS, SSS) and the PBCH (and the DMRS for the PBCH) may be referred to as an SS/PBCH block, an SS block (SSB), and the like. Note that the SS, the SSB, or the like may also be referred to as a reference signal.

Further, in the radio communication system 1, a sounding reference signal (SRS), the demodulation reference signal (DMRS), and the like may be transmitted as an uplink reference signal (UL-RS). Note that the DMRS may be referred to as a "user terminal-specific reference signal (UE-specific Reference Signal)."

(Base Station)

Figure 7:
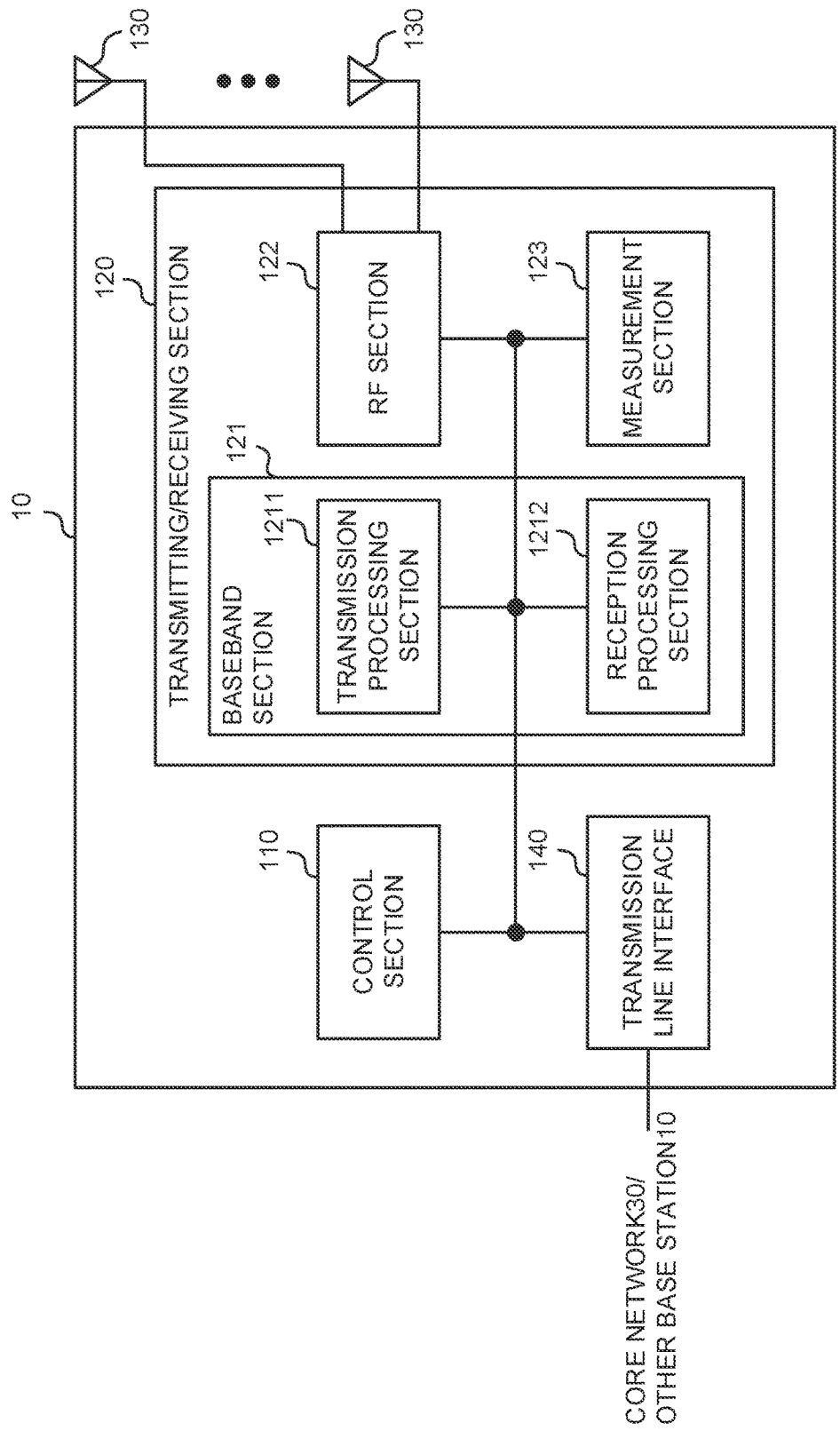
FIG. 7 is a diagram illustrating an example of a configuration of a base station according to one embodiment.

FIG. 7 is a diagram illustrating an example of a configuration of a base station according to one embodiment. The base station 10 includes a control section 110, a transmission/reception section 120, a transmission/reception antenna 130, and a transmission line interface 140. Note that one or more each of the control sections 110, the transmission/reception sections 120, the transmission/reception antennas 130, and the transmission line interfaces 140 may be included.

Note that this example mainly describes functional blocks of characteristic parts in the present embodiment, and it may be assumed that the base station 10 also includes other functional blocks necessary for radio communication. A part of processing of each section described below may be omitted.

The control section 110 controls the entire base station 10. The control section 110 can include a controller, a control circuit, and the like that are described on the basis of common recognition in the technical field related to the present disclosure.

The control section 110 may control signal generation, scheduling (for example, resource allocation, mapping), and the like. The control section 110 may control transmission/reception, measurement, and the like using the transmission/reception section 120, the transmission/reception antenna 130, and the transmission line interface 140. The control section 110 may generate data, control information, a sequence, and the like to be transmitted as signals, and may transfer the data, the control information, the sequence, and the like to the transmission/reception section 120. The control section 110 may perform call processing (such as configuration or release) of a communication channel, state management of the base station 10, management of a radio resource, and the like.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmission/reception section 120 may be formed as an integrated transmission/reception section, or may include a transmission section and a reception section. The transmission section may include the transmission processing section 1211 and the RF section 122. The reception section may include the reception processing section 1212, the RF section 122, and the measurement section 123.

The transmission/reception antenna 130 can include an antenna described on the basis of common recognition in the technical field related to the present disclosure, for example, an array antenna or the like.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a transmission beam and a reception beam by using digital beam forming (for example, precoding), analog beam forming (for example, phase rotation), or the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data, control information, and the like acquired from the control section 110, to generate a bit string to be transmitted.

The transmission/reception section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmission/reception section 120 (RF section 122) may perform modulation to a radio frequency range, filtering processing, amplification, and the like on the baseband signal, to transmit a signal in the radio frequency range via the transmission/reception antenna 130.

Meanwhile, the transmission/reception section 120 (RF section 122) may perform amplification, filtering processing, demodulation to a baseband signal, and the like on the signal in the radio frequency range received by the transmission/reception antenna 130.

The transmission/reception section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmission/reception section 120 (measurement section 123) may perform measurement on the received signal. For example, the measurement section 123 may perform radio resource management (RPM) measurement, channel state information (CSI) measurement, and the like on the basis of the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception (backhaul signaling) of a signal to/from apparatuses, other base stations 10, and the like included in the core network 30, and may perform acquisition, transmission, and the like of user data (user plane data), control plane data, and the like for the user terminal 20.

Note that the transmission section and the reception section of the base station 10 in the present disclosure may include at least one of the transmission/reception section 120, the transmission/reception antenna 130, or the transmission line interface 140.

Note that, in a case where a beam failure of a given cell is detected, the transmission/reception section 120 receives information regarding a new candidate beam (for example, an RS index or the like). Further, the transmission/reception section 120 may transmit information regarding the RS for the new candidate beam and information regarding the given RS.

The control section 110 controls configuration of the RS for the new candidate beam for each cell (or CC). Further, the control section 110 may perform control so that another RS is applied to the UE as the RS for the new candidate beam in a cell in which the RS for the new candidate beam is not configured.

(User Terminal)

Figure 8:
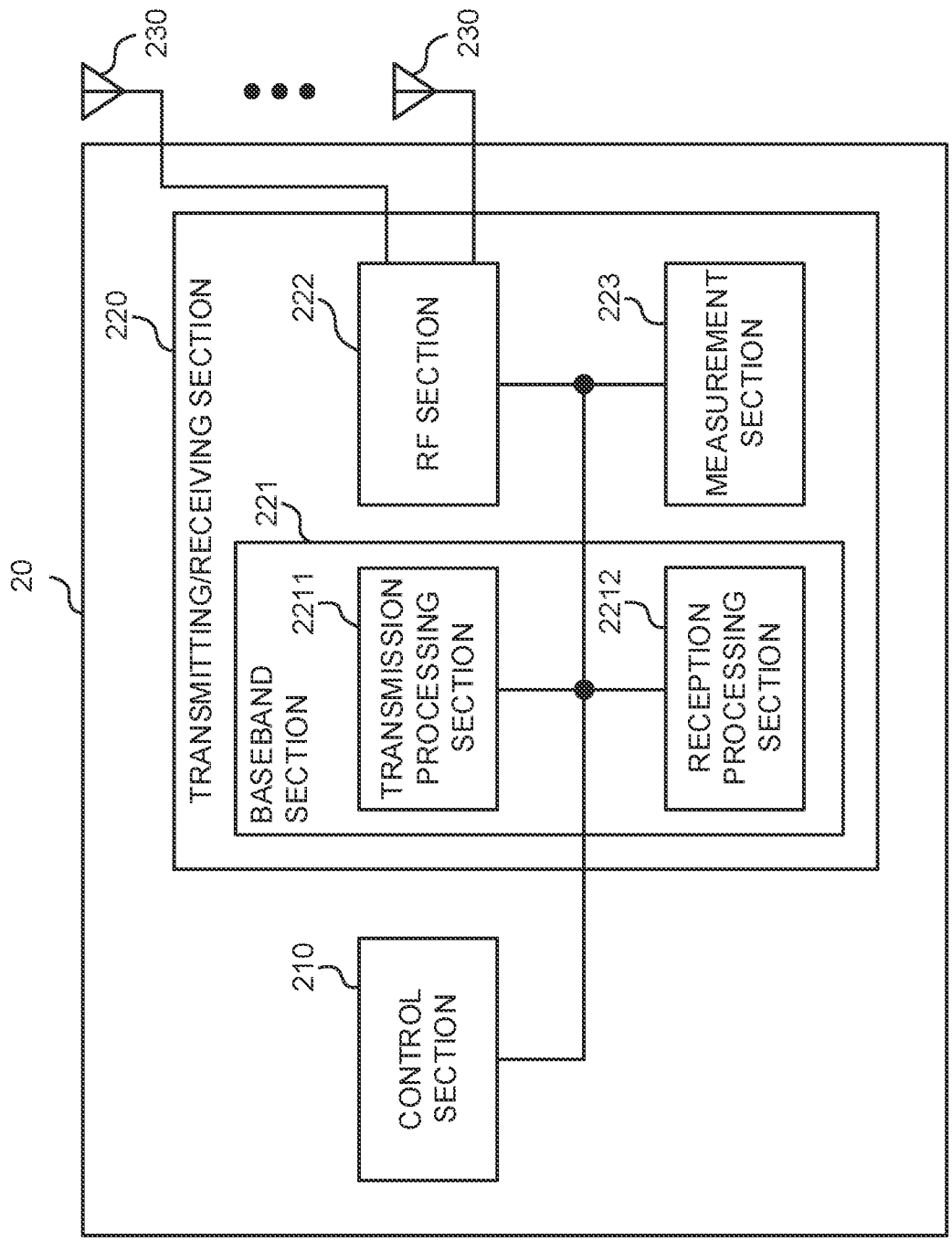
FIG. 8 is a diagram illustrating an example of a configuration of a user terminal according to one embodiment.

FIG. 8 is a diagram illustrating an example of a configuration of a user terminal according to one embodiment. The user terminal 20 includes a control section 210, a transmission/reception section 220, and a transmission/reception antenna 230. Note that one or more each of the control sections 210, the transmission/reception sections 220, and the transmission/reception antennas 230 may be included.

Note that this example mainly describes functional blocks of characteristic parts of the present embodiment, and it may be assumed that the user terminal 20 also includes other functional blocks necessary for radio communication. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmission/reception section 220 and the transmission/reception antenna 230. The control section 210 may generate data to be transmitted as a signal, control information, a sequence, and the like, and may transfer the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmission/reception section 220 may be formed as an integrated transmission/reception section, or may include a transmission section and a reception section. The transmission section may include the transmission processing section 2211 and the RF section 222. The reception section may include the reception processing section 2212, the RF section 222, and the measurement section 223.

The transmission/reception antenna 230 can include an antenna described on the basis of common recognition in the technical field related to the present disclosure, for example, an array antenna or the like.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a transmission beam and a reception beam by using digital beam forming (for example, precoding), analog beam forming (for example, phase rotation), or the like.

The transmission/reception section 220 (transmission processing section 2211) may perform PDCP layer processing, RLC layer processing (for example, RLC retransmission control), MAC layer processing (for example, HARQ retransmission control), and the like, for example, on data, control information, and the like acquired from the control section 210, to generate a bit string to be transmitted.

The transmission/reception section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined on the basis of configuration of transform precoding. In a case where transform precoding is enabled for a channel (for example, PUSCH), the transmission/reception section 220 (transmission processing section 2211) may perform DFT processing as the transmission processing in order to transmit the channel using a DFT-s-OFDM waveform. In a case where it is not the case, DFT processing need not be performed as the transmission processing.

The transmission/reception section 220 (RF section 222) may perform modulation to a radio frequency range, filtering processing, amplification, and the like on the baseband signal, to transmit a signal in the radio frequency range via the transmission/reception antenna 230.

Meanwhile, the transmission/reception section 220 (RF section 222) may perform amplification, filtering processing, demodulation to a baseband signal, and the like on the signal in the radio frequency range received by the transmission/reception antenna 230.

The transmission/reception section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmission/reception section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, SNR), signal strength (for example, RSSI), propagation path information (for example, CSI), and the like. The measurement result may be output to the control section 210.

Note that the transmission section and the reception section of the user terminal 20 in the present disclosure may include at least one of the transmission/reception section 220 or the transmission/reception antenna 230.

The transmission/reception section 220 transmits information regarding a new candidate beam in a case where a beam failure of a given cell is detected. Further, the transmission/reception section 220 may receive the information regarding the RS for the new candidate beam and the information regarding the given RS.

In a case where the reference signal for the new candidate beam is not configured, the control section 210 performs control to use a given reference signal as the reference signal for the new candidate beam.

The given reference signal may be at least one of a reference signal configured for beam failure detection, a reference signal associated with a given control resource set, a set of reference signals configured in a transmission configuration indication state of a downlink channel, a set of reference signals activated for transmission configuration indication information of the downlink channel, or a set of reference signals configured in the given cell or another cell.

The given reference signal may be a reference signal for a new candidate beam configured in another cell different from the given cell.

The given reference signal may be at least one of a set of reference signals configured in a transmission configuration indication state of a downlink channel configured in the given cell or another cell, or a set of reference signals activated for transmission configuration indication information of the downlink channel.

The given reference signal may be at least one of a reference signal for a new candidate beam configured in at least one cell of an identical cell group, a set of reference signals configured in a transmission configuration indication state of a downlink channel, or a set of reference signals activated for transmission configuration indication information of the downlink channel.

(Hardware Configuration)

Note that the block diagrams that have been used to describe the above embodiments illustrate blocks in functional units. These functional blocks (configuration sections) may be implemented in any combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, radio, or the like, for example) together and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration section) that causes transmission to function may be referred to as a transmission section (transmitting unit), a transmitter, and the like. In any case, as described above, the implementation method is not particularly limited.

Figure 9:
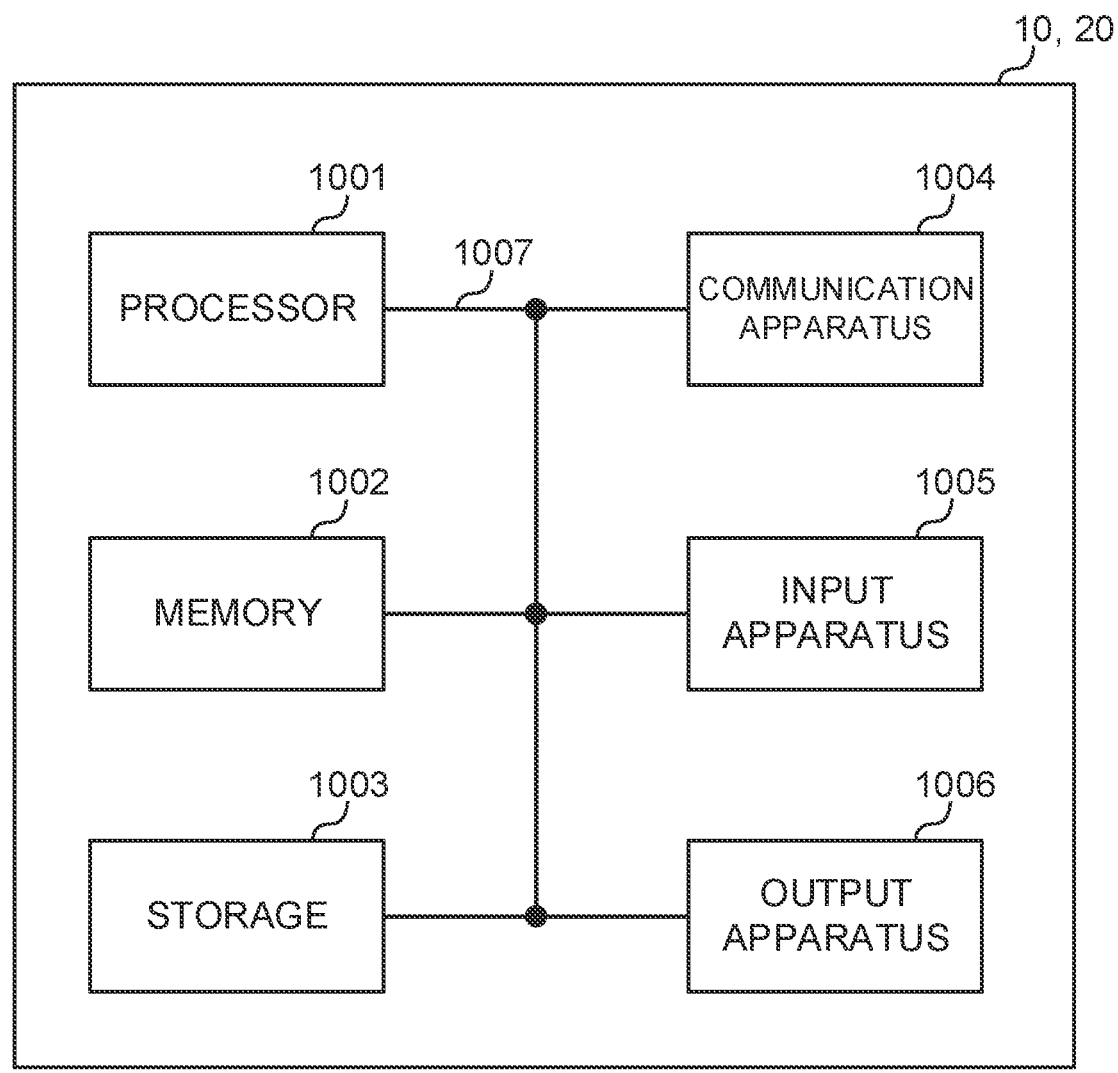
FIG. 9 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 9 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be replaced with each other. The hardware configuration of the base station 10 and the user terminal 20 may include one or a plurality of apparatuses illustrated in the figure, or does not have to include some apparatuses.

For example, although only one processor 1001 is illustrated, a plurality of processors may be provided. Further, the processing may be executed by one processor, or the processing may be executed by two or more processors simultaneously, sequentially, or using another method. Note that the processor 1001 may be implemented by one or more chips.

Each of functions of the base station 10 and the user terminal 20 is implemented by, for example, the processor 1001 executing an operation by reading predetermined software (program) on hardware such as the processor 1001 or the memory 1002, controlling communication via the communication apparatus 1004, and controlling at least one of reading or writing of data in the memory 1002 and the storage 1003.

The processor 1001 may control the entire computer by, for example, causing an operating system to be operated. The processor 1001 may include a central processing unit (CPU) including an interface with peripheral equipment, a control device, an arithmetic device, a register, and the like. For example, at least a part of the above-described control section 110 (210), transmission/reception section 120 (220), or the like may be implemented by the processor 1001.

Further, the processor 1001 reads programs (program codes), software modules, or data, from at least one of the storage 1003 or the communication apparatus 1004, into the memory 1002, and executes various types of processing in accordance with these. As the program, a program to cause a computer to execute at least a part of the operation described in the above-described embodiment is used. For example, the control section 110 (210) may be implemented by a control program that is stored in the memory 1002 and operates in the processor 1001, and other functional blocks may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM) and/or other appropriate storage media. The memory 1002 may be referred to as a register, a cache, a main memory (main storage apparatus), or the like. The memory 1002 can store programs (program codes), software modules, and the like that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication through at least one of a wired network or a radio network, and may be referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the above-described transmission/reception section 120 (220), transmission/reception antenna 130 (230), and the like may be implemented by the communication apparatus 1004. In the transmission/reception section 120 (220), implementation may be made in which a transmission section 120a (220a) and a reception section 120b (220b) are separated from each other physically or logically.

The input apparatus 1005 is an input device that receives input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may be provided in an integrated configuration (for example, a touch panel).

Further, these apparatuses such as the processor 1001 and the memory 1002 are connected to each other by the bus 1007 to communicate information. The bus 1007 may be formed with a single bus, or may be formed with different buses for respective connections between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. A reference signal can be abbreviated as an "RS", and may be referred to as a pilot, a pilot signal, and the like, depending on which standard applies. Further, a component carrier (CC) may be referred to as a cell, a frequency carrier, a carrier frequency, and the like.

A radio frame may include one or a plurality of periods (frames) in the time domain. Each of the one or plurality of periods (frames) constituting the radio frame may be referred to as a subframe. Furthermore, the subframe may include one or a plurality of slots in the time domain. The subframe may be a fixed time length (for example, 1 ms) that is not dependent on numerology.

Here, the numerology may be a communication parameter applied to at least one of transmission or reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and a specific windowing processing performed by the transceiver in the time domain.

A slot may include one or a plurality of symbols in the time domain (orthogonal frequency division multiplexing (OFDM) symbols, single carrier frequency division multiple access (SC-FDMA) symbols, and the like). Further, the slot may be a time unit based on the numerology.

The slot may include a plurality of mini slots. Each mini slot may include one or a plurality of symbols in the time domain. Further, the mini slot may be referred to as a sub-slot. Each mini slot may include fewer symbols than the slot. A PDSCH (or PUSCH) transmitted in a time unit larger than a mini slot may be referred to as a PDSCH (PUSCH) mapping type A. A PDSCH (or PUSCH) transmitted using a mini slot may be referred to as a PDSCH (PUSCH) mapping type B.

The radio frame, subframe, slot, mini slot, and symbol all represent the time unit in signal communication. Other names may be used respectively corresponding to the radio frame, subframe, slot, mini slot, and symbol. Note that time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe or TTI may be a subframe (1 ms) in the existing LTE, may be a period shorter than 1 ms (for example, one to thirteen symbols), or may be a period longer than 1 ms. Note that a unit to represent a TTI may be referred to as a slot, a mini slot, or the like, instead of a subframe.

Here, the TTI refers to the minimum time unit of scheduling in radio communication, for example. For example, in the LTE system, a base station performs scheduling to allocate radio resources (a frequency bandwidth, transmit power, and the like that can be used in each user terminal) to each user terminal in TTI units. Note that a definition of the TTI is not limited thereto.

The TTI may be a transmission time unit of a channel-encoded data packet (transport block), a code block, a codeword, or the like, or may be a processing unit of scheduling, link adaptation, or the like. Note that when the TTI is given, a time interval (for example, the number of symbols) to which the transport block, code block, codeword, or the like is actually mapped may be shorter than the TTI.

Note that in a case where one slot or one mini slot is referred to as a TTI, one or more TTIs (that is, one or more slots or one or more mini slots) may be the minimum time unit of scheduling. Further, the number of slots (the number of mini slots) constituting the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI shorter than the usual TTI may be referred to as a shortened TTI, a short TTI, a partial TTI (or fractional TTI), a shortened subframe, a short subframe, a mini slot, a sub-slot, a slot, or the like.

Note that the long TTI (for example, the usual TTI, subframe, or the like) may be replaced with a TTI having a time length exceeding 1 ms, and the short TTI (for example, the shortened TTI or the like) may be replaced with a TTI having a TTI length less than the TTI length of the long TTI and not less than 1 ms.

A resource block (RB) is a resource allocation unit in the time domain and the frequency domain, and may include one or a plurality of consecutive subcarriers in the frequency domain. The number of subcarriers included in the RB may be the same regardless of the numerology, and may be twelve, for example. The number of subcarriers included in the RB may be determined on the basis of the numerology.

Further, the RB may include one or a plurality of symbols in the time domain, and may be one slot, one mini slot, one subframe or one TTI in length. One TTI, one subframe, and the like each may include one or a plurality of resource blocks.

Note that one or a plurality of RBs may be referred to as a physical resource block (physical RB (PRB)), a subcarrier group (SCG), a resource element group (REG), a PRB pair, an RB pair, or the like.

Further, the resource block may include one or a plurality of resource elements (REs). For example, one RE may be a radio resource area of one subcarrier and one symbol.

A bandwidth part (BWP) (which may be referred to as a partial bandwidth or the like) may represent a subset of consecutive common resource blocks (RBs) for certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or a plurality of BWPs may be configured within one carrier.

At least one of the configured BWPs may be active, and the UE does not have to assume to transmit and receive a given signal/channel outside the active BWP. Note that "cell", "carrier", or the like in the present disclosure may be replaced with "BWP".

Note that structures of the radio frame, subframe, slot, mini slot, symbol, and the like described above are merely examples. For example, configurations such as the number of subframes included in the radio frame, the number of slots per subframe or radio frame, the number of mini slots included in the slot, the number of symbols and RBs included in the slot or mini slot, the number of subcarriers included in the RB, the number of symbols in the TTI, the symbol length, the cyclic prefix (CP) length, and the like can be variously changed.

Further, the information, parameters, and the like described in the present disclosure may be represented by using absolute values, may be represented by using relative values with respect to given values, or may be represented by using other corresponding information. For example, the radio resource may be indicated by a given index.

Names used for the parameters and the like in the present disclosure are not restrictive names in any respect. Furthermore, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a various different technologies. For example, data, an instruction, a command, information, a signal, a bit, a symbol, a chip, and the like that can be referenced throughout the above description may be represented by a voltage, a current, an electromagnetic wave, a magnetic field or a magnetic particle, an optical field or a photon, or any combination of these.

Further, the information, signals, and the like can be output in at least one of a direction from higher layers to lower layers or a direction from lower layers to higher layers. The information, signals, and the like may be input and output via a plurality of network nodes.

The information, signals, and the like that are input and/or output may be stored in a specific location (for example, in a memory), or may be managed with a management table. The information, signals, and the like to be input and/or output can be overwritten, updated, or appended. The information, signals, and the like that are output may be deleted. The information, signals, and the like that are input may be transmitted to other apparatuses.

Notification of information may be performed not only by using the aspects/embodiments described in the present disclosure but also by using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, or the like. Further, notification of the MAC signaling may be given by using, for example, a MAC control element (MAC control element (CE)).

Further, notification of given information (for example, notification of information to the effect that "X holds") is not limited to an explicit notification, and may be made implicitly (for example, by not making the given notification, or by notification of other information).

Judging may be made in values represented by one bit (0 or 1), may be made in Boolean values that represent true or false, or may be made by comparing numerical values (for example, comparison with a given value).

Regardless of being referred to as software, firmware, middleware, a microcode, or a hardware description language, or being referred to as another name, software should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, the software, instruction, information, and the like may be transmitted and received via a transmission medium. For example, in a case where software is transmitted from a website, a server, or another remote source by using at least one of a wired technology (coaxial cable, optical fiber cable, twisted-pair, digital subscriber line (DSL), or the like) or a radio technology (infrared rays, microwaves, or the like), at least one of the wired technology or the radio technology is included within a definition of the transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. In a case where the base station accommodates a plurality of cells, an entire coverage area of the base station can be partitioned into a plurality of smaller areas, and each smaller area can provide a communication service through a base station subsystem (for example, an indoor small base station (remote radio head (RRH))). The term "cell" or "sector" refers to a part or the whole of a coverage area of at least one of a base station or a base station subsystem that provide a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmission apparatus, a reception apparatus, a radio communication apparatus, or the like. Note that at least one of the base station or the mobile station may be a device mounted on a mobile body, the mobile body itself, or the like. The mobile body may be a transportation (for example, a car, an airplane, or the like), may be an unmanned mobile body (for example, a drone, an autonomous car, or the like), or may be a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication between a plurality of user terminals (which may be referred to as, for example, device-to-device (D2D), vehicle-to-everything (V2X), or the like). In this case, the user terminal 20 may have the function of the base station 10 described above. Further, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with the base station. In this case, the base station 10 may have the function of the user terminal 20 described above.

In the present disclosure, the operation performed by the base station may be performed by an upper node thereof in some cases. In a network including one or a plurality of network nodes including the base station, it is clear that various operations performed for communication with the terminal can be performed by the base station, one or more network nodes (for example, a mobility management entity (MME), a serving-gateway (S-GW), and the like are conceivable, but not limited thereto) other than the base station, or a combination thereof.

Each aspect/embodiment described in the present disclosure may be used alone, used in combination, or switched in association with execution. Further, the order in a processing procedure, a sequence, a flowchart, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), Global System for Mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), or another appropriate radio communication method, a next generation system extended on the basis of these, and the like. Further, a plurality of systems may be combined (for example, a combination of LTE or LTE-A and 5G) and applied.

The phrase "on the basis of" as used in the present disclosure does not mean "on the basis of only", unless otherwise specified. In other words, the phrase "on the basis of" means both "on the basis of only" and "on the basis of at least".

Any reference to an element using designations such as "first" and "second" used in the present disclosure does not generally limit the amount or order of these elements. These designations may be used in the present disclosure only for convenience as a method for distinguishing between two or more elements. Thus, reference to the first and second elements does not mean that only two elements are employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, or the like.

Further, "determining" may be regarded as "determining" of receiving (for example, receiving information), transmitting (for example, transmitting information), inputting, outputting, accessing (for example, accessing data in a memory), and the like.

Further, "determining" may be regarded as "determining" of resolving, selecting, choosing, establishing, comparing, and the like. That is, "determining" may be regarded as "determining" of some operation.

Further, "determining" may be replaced with "assuming", "expecting", "considering", and the like.

As used in the present disclosure, the terms "connected" and "coupled", or any variation of these terms mean all direct or indirect connections or couplings between two or more elements, and may include the presence of one or more intermediate elements between two elements that are "connected" or "coupled" to each other. The coupling or connection between the elements may be physical, logical or a combination of these. For example, "connection" may be replaced with "access".

In the present disclosure, in a case where two elements are connected to each other, it is conceivable that the elements are "connected" or "coupled" to each other by using one or more electrical wires, cables, printed electrical connections, and the like, and, as some non-limiting and non-inclusive examples, by using electromagnetic energy having wavelengths in the radio frequency, microwave, and optical (both visible and invisible) regions, or the like.

In the present disclosure, a term "A and B are different" may mean "A and B are different from each other". Note that the term may mean that "A and B are different from C". The terms such as "separated", "coupled", and the like may be interpreted as "different".

In a case where the terms such as "include", "including", and variations of these are used in the present disclosure, these terms are intended to be inclusive, similarly to the term "comprising". Furthermore, the term "or" as used in the present disclosure is intended to be not an exclusive-OR.

In the present disclosure, for example, in a case where translations add articles such as a, an, and the in English, the present disclosure may include that the noun that follows these articles is in the plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Thus, the description of the present disclosure is for the purpose of explaining examples and does not bring any limiting meaning to the invention according to the present disclosure.

The invention claimed is:

1. A terminal comprising:
a receiver that:
receives information regarding a cell among a configured cell group comprising a plurality of cells, a reference signal for a candidate beam configured in the cell identified by the information, and
receives information regarding an index of the reference signal for the candidate beam; and
a processor that, in response to beam failure detection, controls to transmit a recovery request on a configured PUCCH resource, and transmit, using MAC CE, information other than the recovery request,
wherein the information other than the recovery request indicates that there is no reference signal for a candidate beam with received power being greater than or equal to a threshold value configured by higher layer signaling, and
wherein the receiver receives, by higher layer signaling, the information regarding the cell and the information regarding the index of the reference signal for the candidate beam, and a reference signal for a candidate beam corresponding to each cell is always configured in a specific frequency bandwidth.

2. A radio communication method for a terminal, comprising:
receiving information regarding a cell among a configured cell group comprising a plurality of cells, a reference signal for a candidate beam configured in the cell identified by the information,
receiving information regarding an index of the reference signal for the candidate beam; and
in response to beam failure detection, controlling to transmit a recovery request on a configured PUCCH resource, and transmit, using MAC CE, information other than the recovery request,
wherein the information other than the recovery request indicates that there is no reference signal for a candidate beam with received power being greater than or equal to a threshold value configured by higher layer signaling, and
wherein the terminal receives, by higher layer signaling, the information regarding the cell and the information regarding the index of the reference signal for the candidate beam, and a reference signal for a candidate beam corresponding to each cell is always configured in a specific frequency bandwidth.

3. A base station comprising:
a transmitter that:
transmits, to a terminal, information regarding a cell among a configured cell group comprising a plurality of cells, a reference signal for a candidate beam configured in the cell identified by the information, and
transmits information regarding an index of the reference signal for the candidate beam; and
a processor that, in response to beam failure detection in the terminal, controls a reception of a recovery request on a configured PUCCH resource, and a reception, using MAC CE, of information other than the recovery request that is transmitted from the terminal based on the information regarding the index of the reference signal for the candidate beam,
wherein the information other than the recovery request indicates that there is no reference signal for a candidate beam with received power being greater than or equal to a threshold value configured by higher layer signaling, and wherein the transmitter transmits, by higher layer signaling, the information regarding the cell and the information regarding the index of the reference signal for the candidate beam, and a reference signal for a candidate beam corresponding to each cell is always configured in a specific frequency bandwidth.

4. A system comprising a terminal and a base station, wherein the terminal comprises:
  a receiver that:
    receives information regarding a cell among a configured cell group comprising a plurality of cells, a reference signal for a candidate beam configured in the cell identified by the information, and
    receives information regarding an index of the reference signal for the candidate beam; and
  a processor of the terminal that, in response to beam failure detection, controls to transmit a recovery request on a configured PUCCH resource, and transmit, using MAC CE, information other than the recovery request,
  wherein the information other than the recovery request indicates that there is no reference signal for a candidate beam with received power being greater than or equal to a threshold value, configured by higher layer signaling, and wherein the receiver receives, by higher layer signaling, the information regarding the cell and the information regarding the index of the reference signal for the candidate beam, and a reference signal for a candidate beam corresponding to each cell is always configured in a specific frequency bandwidth, and the base station comprises:
  a transmitter that:
    transmits, to the terminal, the information regarding the cell among the configured cell group comprising the plurality of cells, the reference signal for the candidate beam configured in the cell identified by the information, and
    transmits the information regarding the index of the reference signal for the candidate beam; and
  a processor of the base station that controls a reception of the recovery request on the configured PUCCH resource, and a reception, using MAC CE, of the information other than the recovery request that is transmitted from the terminal based on the information regarding the index of the reference signal for the candidate beam,
wherein the information other than the recovery request indicates that there is no reference signal for a candidate beam with received power being greater than or equal to the threshold value configured by higher layer signaling.

* * * * *